(12) United States Patent
Suzuki

(10) Patent No.: US 12,429,753 B2
(45) Date of Patent: Sep. 30, 2025

(54) LENS APPARATUS THAT TRANSMITS TILT-SHIFT INFORMATION TO ATTACHED IMAGE PICKUP APPARATUS AND IMAGE PICKUP APPARATUS ATTACHABLE TO THE LENS APPARATUS

(71) Applicant: CANON KABUSHIKI KAISHA, Tokyo (JP)

(72) Inventor: Kazuto Suzuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 102 days.

(21) Appl. No.: 18/299,944

(22) Filed: Apr. 13, 2023

(65) Prior Publication Data
US 2023/0341753 A1    Oct. 26, 2023

(30) Foreign Application Priority Data

Apr. 22, 2022    (JP) .................................. 2022-070734

(51) Int. Cl.
| | |
|---|---|
| *H04N 5/335* | (2011.01) |
| *G03B 5/00* | (2021.01) |
| *G03B 13/34* | (2021.01) |
| *G03B 17/14* | (2021.01) |
| *G03B 17/20* | (2021.01) |
| *H04N 23/63* | (2023.01) |

(52) U.S. Cl.
CPC .............. *G03B 17/20* (2013.01); *G03B 5/00* (2013.01); *G03B 13/34* (2013.01); *G03B 17/14* (2013.01); *H04N 23/633* (2023.01); *G03B 2205/0023* (2013.01)

(58) Field of Classification Search
CPC .............................................. G03B 2205/0023
See application file for complete search history.

(56) References Cited

U.S. PATENT DOCUMENTS

| | | | |
|---|---|---|---|
| 8,792,018 B2* | 7/2014 | Matsuzawa ............ | H04N 23/67 348/333.01 |
| 9,019,310 B2* | 4/2015 | Intwala ..................... | G06T 5/70 345/647 |
| 2009/0015704 A1* | 1/2009 | Namai ..................... | G03B 9/08 348/E5.037 |
| 2010/0209097 A1* | 8/2010 | Sasaki ..................... | G03B 17/14 396/529 |
| 2012/0070141 A1* | 3/2012 | Scholz ................. | G03B 17/565 396/342 |

(Continued)

FOREIGN PATENT DOCUMENTS

| | | |
|---|---|---|
| JP | 2011041092 A | 2/2011 |
| JP | 2014074850 A * | 4/2014 |

*Primary Examiner* — Gary C Vieaux
(74) *Attorney, Agent, or Firm* — ROSSI, KIMMS & McDOWELL LLP

(57) ABSTRACT

A lens apparatus attachable to and detachable from an image pickup apparatus includes an imaging optical system that includes at least one optical member configured to move so as to change at least one of a tilt effect of tilting a focal plane relative to an imaging plane of an image sensor included in the image pickup apparatus and a shift effect of moving an imaging range, and a transmitting unit configured to transmit information about a movable range of the at least one optical member to the image pickup apparatus.

21 Claims, 7 Drawing Sheets

(56) References Cited

U.S. PATENT DOCUMENTS

2015/0234198 A1\* 8/2015 Hayakawa ............. G03B 17/14
  348/375
2019/0066275 A1\* 2/2019 Ito .......................... H04N 23/95
2019/0349530 A1\* 11/2019 Niga .................... H04N 23/631

\* cited by examiner

LENS APPARATUS THAT TRANSMITS TILT-SHIFT INFORMATION TO ATTACHED IMAGE PICKUP APPARATUS AND IMAGE PICKUP APPARATUS ATTACHABLE TO THE LENS APPARATUS

BACKGROUND

Technical Field

One aspect of the embodiments relates to a lens apparatus and an image pickup apparatus.

Description of Related Art

For tilt-shift imaging that includes at least one of tilt imaging that has a tilt effect of tilting a focal plane relative to an imaging plane of an image sensor and shift imaging that has a shift effect of moving an imaging range, the conventional lens interchangeable type cameras adjust a tilt-shift amount including at least one of a shift amount and a tilt amount of a lens relative to an imaging plane. Japanese Patent Laid-Open No. (JP) 2011-41092 discloses a configuration for displaying a depth of field based on the tilt-shift amount on a screen of the camera.

However, the configuration disclosed in JP 2011-41092 does not enable the user to confirm the current tilt-shift amount.

SUMMARY

One of the aspects of the present disclosure provides a lens apparatus that enables the user to confirm a tilt-shift amount on a display screen of an image pickup apparatus.

A lens apparatus according to one aspect of the disclosure is attachable to and detachable from an image pickup apparatus. The lens apparatus includes an imaging optical system that includes at least one optical member configured to move so as to change at least one of a tilt effect of tilting a focal plane relative to an imaging plane of an image sensor included in the image pickup apparatus and a shift effect of moving an imaging range, and a transmitting unit configured to transmit information about a movable range of the at least one optical member to the image pickup apparatus. An image pickup apparatus according to another aspect of the disclosure is attachable to and detachable from the above lens apparatus and includes a display unit configured to display information about imaging.

Further features of the disclosure will become apparent from the following description of embodiments with reference to the attached drawings.

DESCRIPTION OF THE EMBODIMENTS

Figure 1:
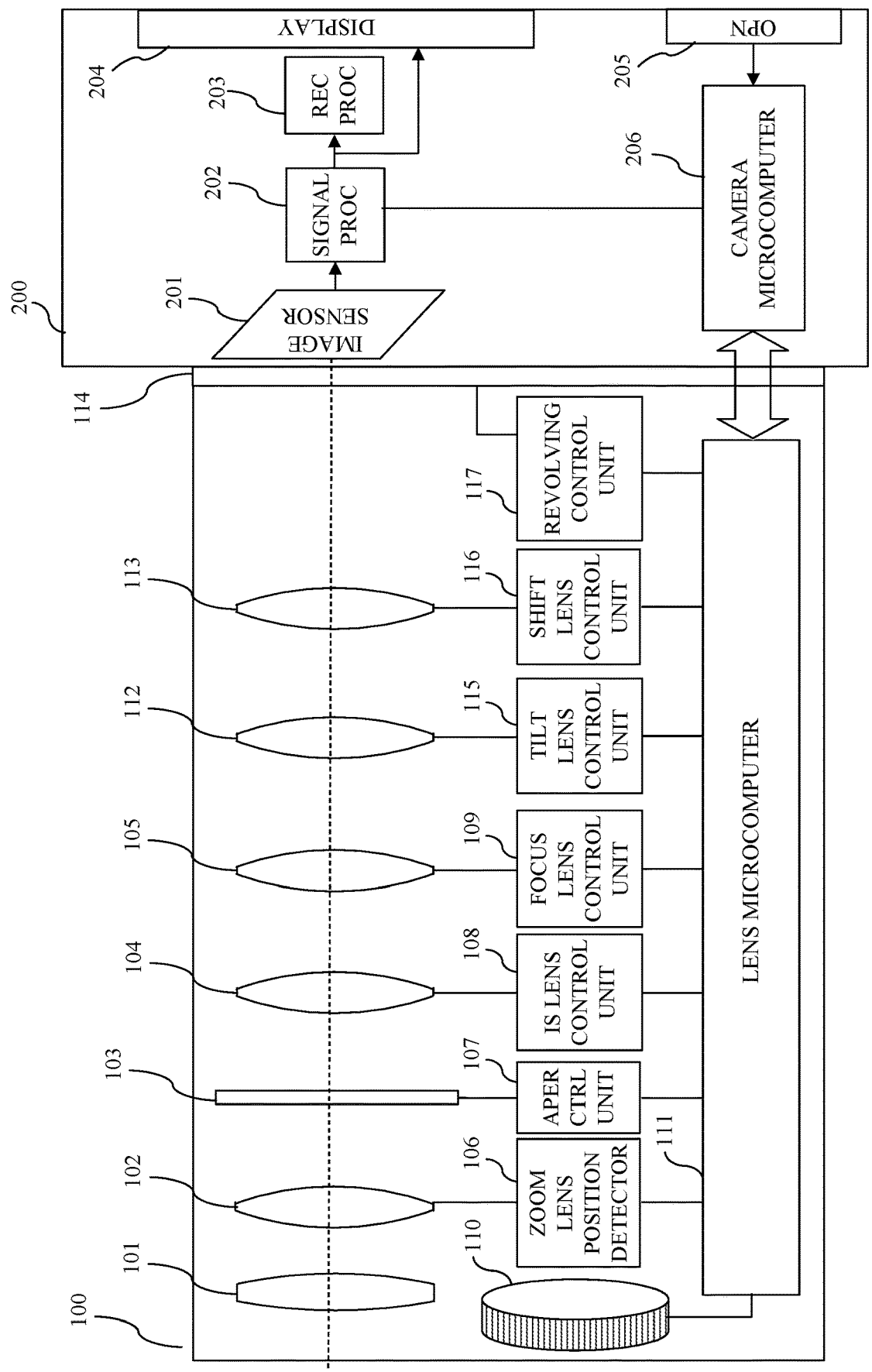
FIG. 1 is a block diagram of a camera system according to one embodiment of the disclosure.

Referring now to the accompanying drawings, a detailed description will be given of embodiments according to the disclosure. Corresponding elements in respective figures will be designated by the same reference numerals, and a duplicate description thereof will be omitted.

FIG. 1 is a block diagram of a camera system according to one embodiment of the disclosure. The camera system includes an interchangeable lens (lens apparatus) 100 and a camera body (image pickup apparatus) 200.

The interchangeable lens 100 is mechanically and electrically connected to the camera body 200 via an unillustrated mount. The interchangeable lens 100 receives power from the camera body 200 via an unillustrated power terminal provided on the above mount. The camera body 200 communicates with the interchangeable lens 100 via an unillustrated communication terminal provided on the above mount and controls the interchangeable lens 100 by transmitting commands.

A description will now be given of the configuration of the camera body 200. The camera body 200 includes an image sensor 201, a signal processing circuit (SIGNAL PROC) 202, a recording processing unit (REC PROC) 203, a display unit (DISPLAY) 204, an operation unit (OPN) 205, and a camera microcomputer 206.

The image sensor 201 photoelectrically converts an object image formed by the imaging optical system in the interchangeable lens 100 and outputs an electric signal (analog signal). The analog signal from the image sensor 201 is converted into a digital signal by an unillustrated analog-to-digital (A/D) conversion circuit.

The signal processing circuit 202 performs various image processing for the digital signal from the A/D conversion circuit to generate a video signal and outputs it to the recording processing unit 203 and display unit 204. The recording processing unit 203 stores as still image data or moving image data the video signal in an external memory or the like. The display unit 204 displays the video signal as a live-view image so that the user can confirm the composition, focus state, and the like. The signal processing circuit 202 also generates a contrast state of the object image from the video signal, that is, focus information on a focus state of the imaging optical system, and luminance information on an exposure state.

The camera microcomputer 206 functions as a control unit configured to control the camera body 200 according to an input to an imaging instruction switch and various setting switches included in the operation unit 205. The camera microcomputer 206 also transmits commands relating to adjustments of an aperture (stop) (diaphragm) unit 103, a focus lens 105, a tilt lens 112, a shift lens 113, and a revolving driving unit 114 to a lens microcomputer 111.

A description will now be given of the configuration of the interchangeable lens 100. The interchangeable lens 100 includes an imaging optical system, various control units configured to control various actuators that drive the imaging optical system, an operation ring 110, and the lens microcomputer 111.

The lens microcomputer 111 controls the operation of each unit within the interchangeable lens 100. The lens microcomputer 111 receives a command transmitted from the camera body 200 and receives a transmission request for lens data. The lens microcomputer 111 controls lenses corresponding to the command, and transmits the lens data corresponding to the transmitted request to the camera body 200.

The lens microcomputer 111 controls the aperture unit 103, the focus lens 105, the tilt lens 112, the shift lens 113, and the revolving driving unit 114 in response to the command. Thereby, light amount adjusting processing and autofocus (AF) processing for controlling focusing operation are performed by the aperture unit 103 and focus lens 105.

The lens microcomputer 111 issues a command to a focus lens control unit 109 according to an operation amount of the operation ring 110 to move the focus lens 105 and control the focusing operation. The operation ring 110 may be configured to operate a plurality of optical members by setting.

The imaging optical system includes a field lens 101, a zoom lens 102 for performing magnification variation, the aperture unit 103 for adjusting the light amount, an image stabilizing lens 104, a focus lens 105 for performing focusing, and a tilt lens 112 and shift lens 113 for performing tilt-shift (TS) imaging.

The zoom lens 102 is movable along an optical axis of the imaging optical system indicated by a dashed line in FIG. 1. The zoom lens 102 moves along the optical axis in a case where the user operates a zoom operation ring connected to an unillustrated zoom mechanism. Thereby, the zoom lens 102 moves and changes a focal length of the imaging optical system. A zoom lens position detector 106 detects the position of the zoom lens 102 using a position detecting sensor such as a variable resistor and outputs position data to the lens microcomputer 111. The output position data is used to control the zoom tracking operation and the like by the lens microcomputer 111.

The aperture unit 103 includes sensors such as aperture blades and a Hall element. The state of the aperture blades is detected by the above sensor and output to the lens microcomputer 111. An aperture control (APER CTRL) unit 107 drives an actuator such as a stepping motor and a voice coil motor in accordance with a command from the lens microcomputer 111. Thereby, the aperture unit 103 adjusts the light amount.

The image stabilizing lens 104 reduces image blur caused by camera shake or the like by moving in a direction orthogonal to the optical axis of the imaging optical system. An image stabilizing (IS) lens control unit 108 drives an image stabilizing actuator according to a command from the lens microcomputer 111 in response to vibration detected by an unillustrated vibration sensor such as a vibration gyro. Thereby, image stabilizing processing for controlling the shift operation of the image stabilizing lens 104 is performed.

The focus lens 105 is movable along the optical axis. Position data of the focus lens 105 detected using a position detecting sensor such as a photo-interrupter is output to the lens microcomputer 111. A focus lens control unit 109 drives an actuator such as a stepping motor according to a command from the lens microcomputer 111 to move the focus lens 105, thereby performing focusing. The focus lens 105 corrects image plane fluctuations associated with magnification variation by the zoom lens 102.

The tilt lens 112 is a first optical member configured to swing at a predetermined angle around an axis orthogonal to the optical axis of the imaging optical system. A tilt lens control unit 115 moves the tilt lens 112 according to a command from the lens microcomputer 111. The position of the tilt lens 112 may be detected by an unillustrated position detector. The shift lens 113 is a second optical member configured to move in the direction orthogonal to the optical axis of the imaging optical system. A shift lens control unit 116 moves the shift lens 113 according to a command from the lens microcomputer 111. The position of the shift lens 113 may be detected by an unillustrated position detector. Tilt-shift driving for moving the tilt lens 112 can provide tilt-shift imaging and control a focal plane. The shift lens 113 may be moved during the tilt-shift driving. More specifically, moving the tilt lens 112 can provide a tilt effect of tilting the focal plane relative to the imaging plane of the image sensor 201. Moving the shift lens 113 can provide a shift effect of moving the imaging range. Although the tilt lens 112 is configured to swing in this embodiment, the disclosure is not limited to this example. The tilt lens 112 may be configured to move in the direction orthogonal to the optical axis of the imaging optical system, similarly to the shift lens 113. While this embodiment moves different lenses to obtain the tilt effect and the shift effect, but may move a single lens to acquire tilt effect and the shift effect.

A revolving driving unit (revolving member) 114 is configured to revolve around the optical axis of the imaging optical system and rotates at least part of the imaging optical system around the optical axis. A revolving control unit 117 moves the revolving driving unit 114 according to a command from the lens microcomputer 111. The position of the revolving driving unit 114 may be detected by an unillustrated position detector. The moving directions of the tilt lens 112 and the shift lens 113 can be controlled (changed) by the revolving driving configured to move the revolving driving unit 114.

The following embodiments will describe a method for displaying information on tilt-shift driving and revolving driving on the display unit 204.

First Embodiment

Figure 2:
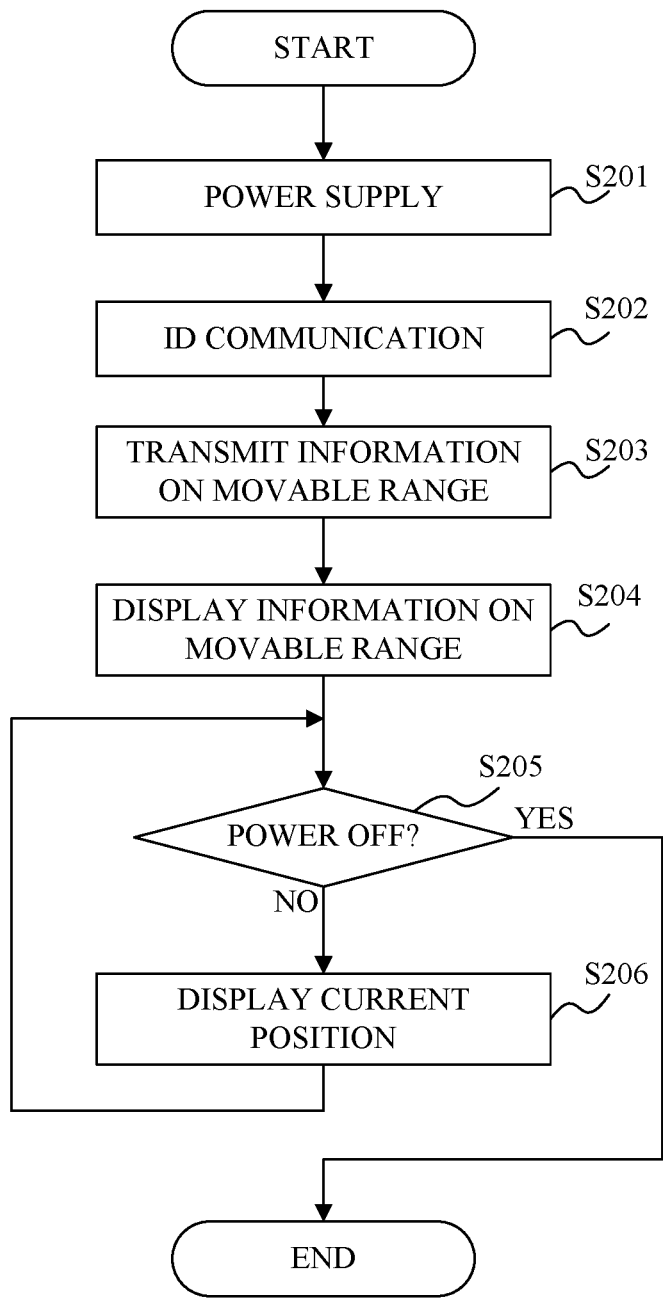
FIG. 2 is a flowchart illustrating an example of a method for displaying information about tilt-shift driving and revolving driving on a display unit according to a first embodiment.

FIG. 2 is a flowchart illustrating an example of a method for displaying information about tilt-shift driving and revolving driving on the display unit 204 according to this embodiment. This flow starts in a case where the camera body 200 is powered on.

In step S201, the camera body 200 supplies power to the interchangeable lens 100.

In step S202, the camera microcomputer 206 performs ID communication with the lens microcomputer 111.

In step S203, the lens microcomputer 111 transmits information about the movable ranges of the tilt lens 112, the shift lens 113, and the revolving driving unit 114 to the camera microcomputer 206. That is, the lens microcomputer 111 functions as a transmitting unit.

In step S204, the camera microcomputer 206 displays information about the movable ranges of the tilt lens 112, shift lens 113, and revolving driving unit 114 on the display unit 204 using the information received in step S204.

In step S205, the camera microcomputer 206 determines whether the power is turned off. In a case where it is determined that the power is not turned off, that is, in a case where it is determined that the power is turned on, the flow proceeds to step S206, and in a case where it is determined that the power is turned off, this flow ends.

In step S206, the camera microcomputer 206 causes the display unit 204 to display the current positions of the tilt lens 112, shift lens 113, and revolving driving unit 114. Thereby, the user can confirm a moving amount (tilt-shift amount) of each of the tilt lens 112 and the shift lens 113 and a moving amount of the revolving driving unit 114. In this embodiment, the camera microcomputer 206 acquires the current positions of the tilt lens 112, the shift lens 113, and the revolving driving unit 114 according to the operations on the camera body 200. That is, this embodiment adjusts the tilt lens 112, the shift lens 113, and the revolving driving unit 114 by operating the camera body 200. However, the disclosure is not limited to this example. The tilt lens 112, the shift lens 113, and the revolving driving unit 114 may be adjusted without operating the camera body 200. At this time, the camera microcomputer 206 may receive the current positions of the tilt lens 112, the shift lens 113, and the revolving driving unit 114 from the lens microcomputer 111.

Figure 3A:
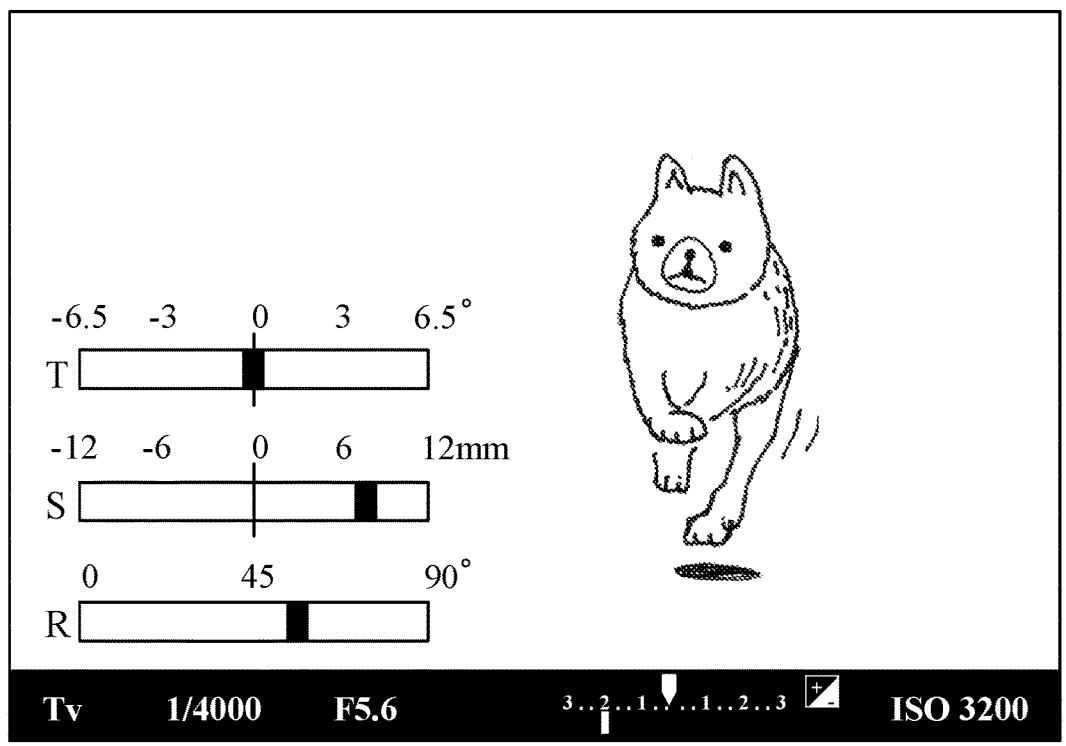
FIGS. 3A and 3B illustrate display examples of information about tilt-shift driving and revolving driving.

FIG. 3A illustrates a display example of information about tilt-shift driving and revolving driving on the display unit 204. In this embodiment, the information on the tilt-shift driving includes information on the movable ranges of the tilt lens 112 and the shift lens 113 and the current positions of the tilt lens 112 and the shift lens 113. The information on the revolving driving includes information on the movable range of the revolving driving unit 114 and the current position of the revolving driving unit 114. In FIG. 3A, the information about the tilt-shift driving and revolving driving is displayed as a bar. More specifically, a bar next to "T" represents the information about the movable range of the tilt lens 112, and the black display in the bar represents the current position of tilt lens 112. A bar next to "S" represents the information on the movable range of the shift lens 113, and black display in the bar represents the current position of the shift lens 113. A bar next to "R" represents the information on the movable range of the revolving driving unit 114, and black display in the bar represents the current position of the revolving driving unit 114. These displays enables the user to adjust the tilt-shift amounts and the revolving amount while continuously viewing the object.

Figure 3B:
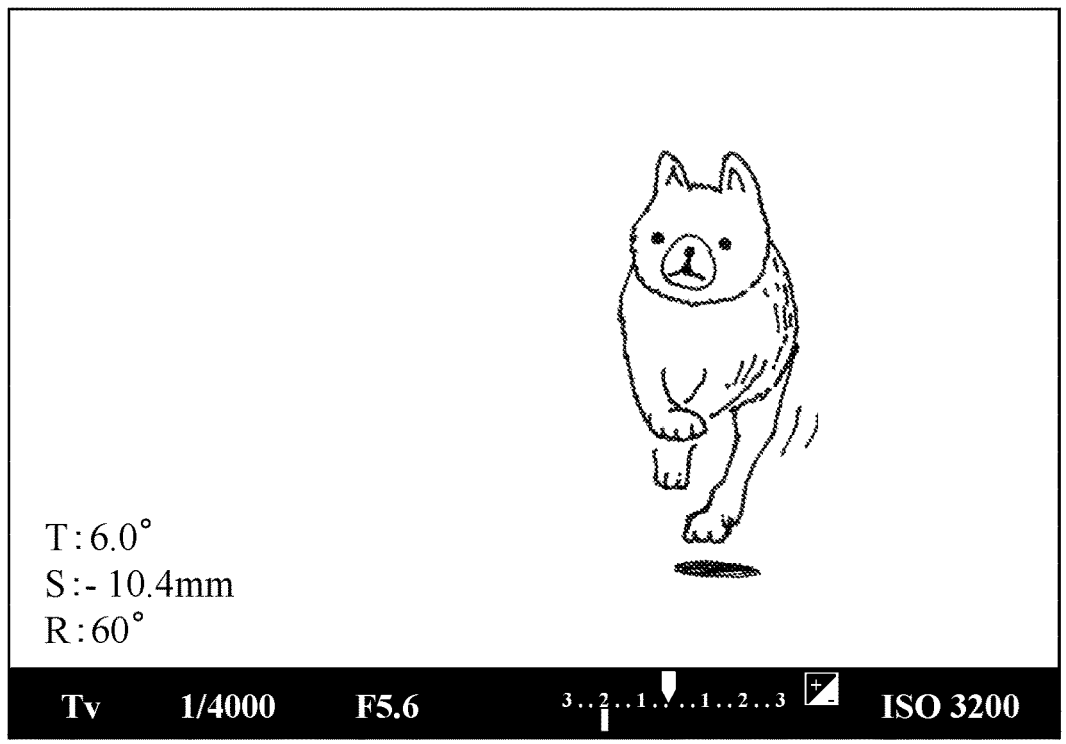

The display of information on the tilt-shift driving and revolving driving is not limited to the displays in FIG. 3A. For example, the display of information on the tilt-shift driving and revolving driving may be numerically displayed as illustrated in FIG. 3A. In FIG. 3B, the information on the tilt-shift driving includes the current positions of tilt lens 112 and shift lens 113, and the information on the revolving driving includes the current position of the revolving driving unit 114. More specifically, the numerical value next to "T" represents the current position of the tilt lens 112, and the numerical value next to "S" represents the current position of the shift lens 113. The numerical value next to "R" represents the current position of the revolving driving unit 114. In the display of FIG. 3B, in a case where the tilt lens 112, the shift lens 113, and the revolving driving unit 114 reach the limit positions of the movable ranges, the color of the numerical value may be changed. The limit position may be received from the lens microcomputer 111.

Figure 4:
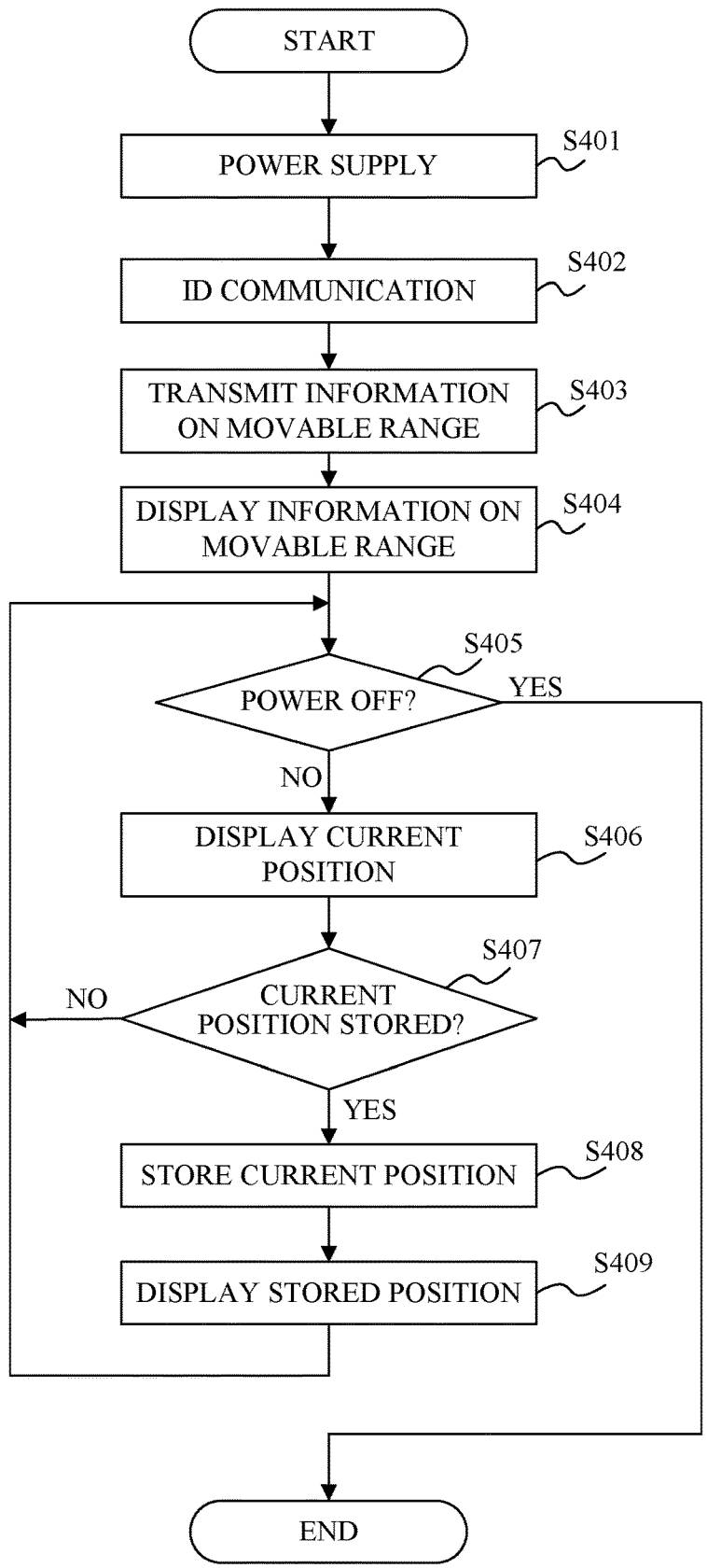
FIG. 4 illustrates another example of a method of displaying information about tilt-shift driving and revolving driving on the display unit according to the first embodiment.

FIG. 4 is a flowchart illustrating another example of a method for displaying information about tilt-shift driving and revolving driving on the display unit 204 according to this embodiment. This flow starts in a case where the camera body 200 is powered on.

Steps S401 to S406 correspond to steps S201 to S206 in FIG. 2, respectively, and a detailed description thereof will be omitted.

In step S407, the camera microcomputer 206 determines whether to store the current positions of the tilt lens 112, the shift lens 113, and the revolving driving unit 114. For example, the camera microcomputer 206 may determine whether to store the current positions of the tilt lens 112, the shift lens 113, and the revolving driving unit 114 according to the instruction of the user. In a case where it is determined that the current positions of the tilt lens 112, the shift lens 113, and the revolving driving unit 114 are to be stored, the flow proceeds to step S408; otherwise, the flow returns to step S405. In this embodiment, it is determined whether or not to store the current positions of all of the tilt lens 112, shift lens 113, and revolving driving unit 114, but the disclosure is not limited to this embodiment. For example, it may be determined whether the current position of each of the tilt lens 112, the shift lens 113, and the revolving driving unit 114 is to be stored.

In step S408, the camera microcomputer 206 stores the current positions of the tilt lens 112, the shift lens 113, and the revolving driving unit 114 in a memory (storage unit) provided to at least one of the camera body 200 and the interchangeable lens 100. Steps S407 and S408 may be executed by the lens microcomputer 111.

In step S409, the camera microcomputer 206 causes the display unit 204 to display the positions (stored positions) of the tilt lens 112, shift lens 113, and revolving driving unit 114 stored in step S408. In a case where the stored positions have already been displayed, the stored positions stored in step S408 may be displayed after the display is turned off.

Figure 5:
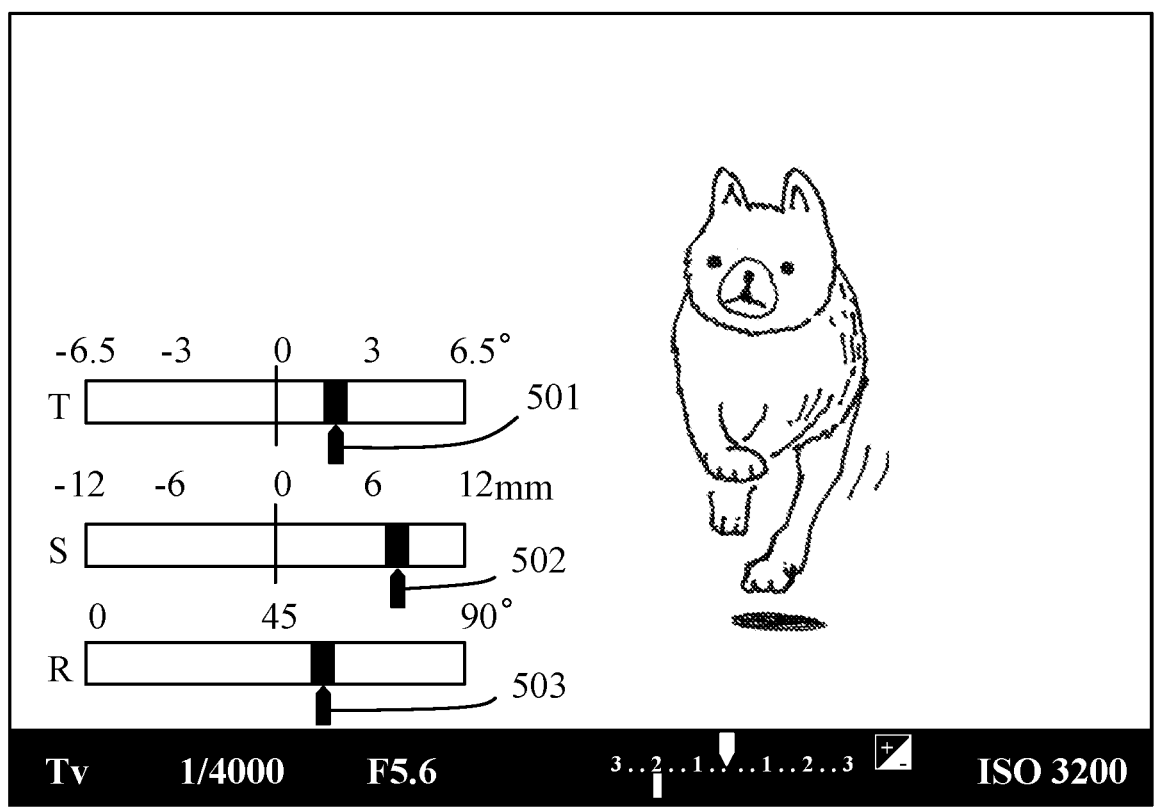
FIG. 5 illustrates another display example of information about tilt-shift driving and revolving driving.

FIG. 5 illustrates a display example of information about the tilt-shift driving and revolving driving on the display unit 204. In addition to the displays of FIGS. 3A and 3B, FIG. 5 illustrates an indication 501 indicating the stored position of the tilt lens 112, an indication 502 indicating the stored position of the shift lens 113, and an indication 503 indicating the stored position of the revolving driving unit 114. Displaying the stored positions enables the user to easily move the tilt lens 112, the shift lens 113, and the revolving driving unit 114 to the desired positions.

As described above, the configuration according to this embodiment enables the user to confirm the tilt-shift amounts on the display unit 204 provided on the camera body 200.

In this embodiment, the display unit 204 displays information about the tilt-shift driving and revolving driving. However, as illustrated in FIGS. 3A and 3B, information about the movement of the focus lens 105 may be displayed on the display unit 204. In this case, one of the information on the tilt-shift driving and revolving driving and the information on movement of the focus lens 105 selected by the user may be displayed. In a case where the focus lens 105 is adjusted, the information on the movement of the focus lens 105 may be displayed, and in a case where a member other than the focus lens 105 is adjusted, the information on the tilt-shift driving and revolving driving may be displayed. The member other than the focus lens 105 includes at least one of the tilt lens 112, the shift lens 113, and the revolving driving unit 114. Any information selected by the user from among the information on the movements of the tilt lens 112, the shift lens 113, the revolving driving unit 114, and the focus lens 105 may be displayed. The information on the movement of one of the tilt lens 112, shift lens 113, revolving driving unit 114, and focus lens 105, that has been adjusted may be displayed.

Second Embodiment

Figure 6:
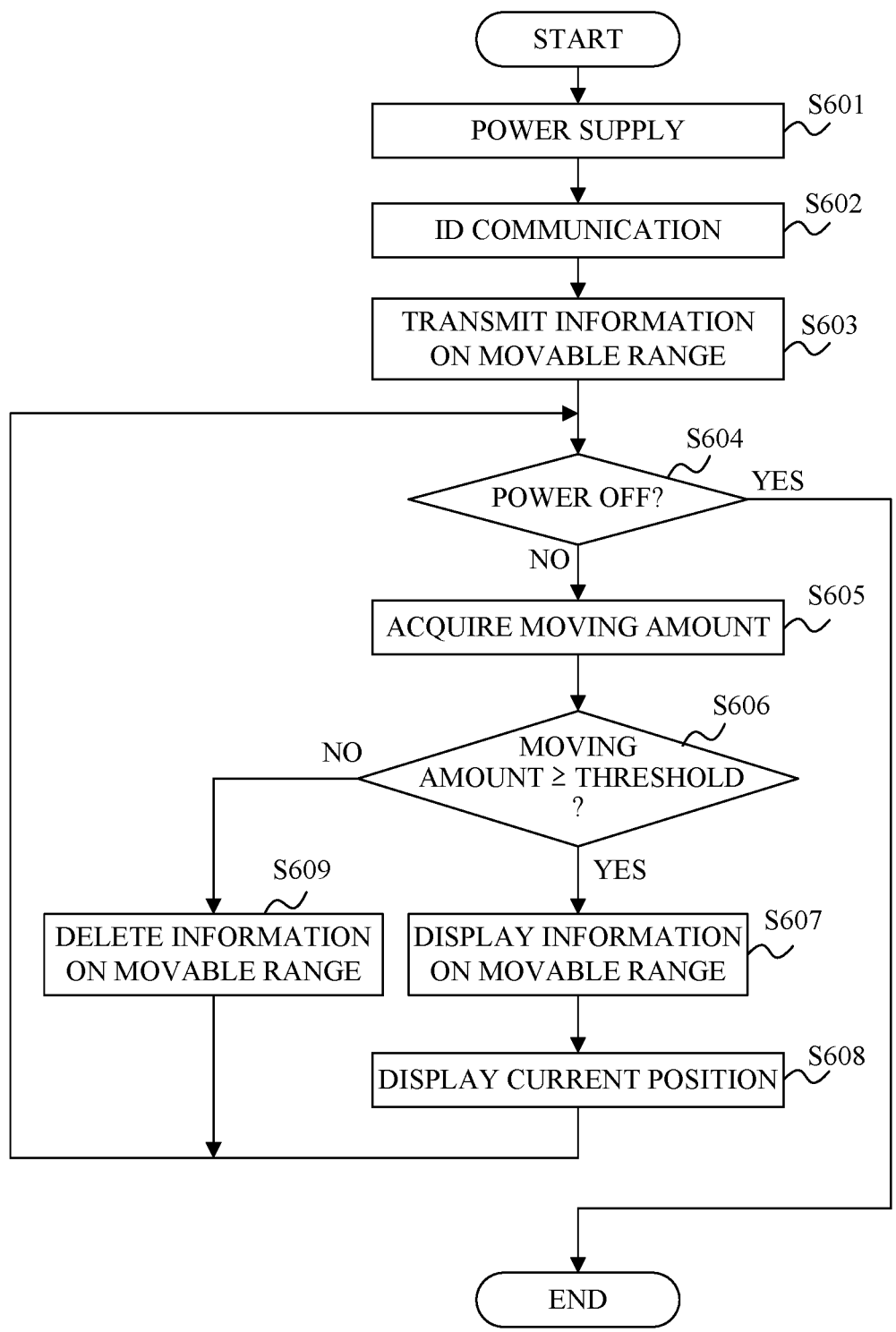
FIG. 6 is a flowchart illustrating an example of a method of displaying information on tilt-shift driving and revolving driving on a display unit according to a second embodiment.

FIG. 6 is a flowchart illustrating an example of a method for displaying information on tilt-shift driving and revolving driving on the display unit 204 according to this embodiment. This flow starts in a case where the camera body 200 is powered on.

Steps S601 to S603 correspond to steps S201 to S203 in FIG. 2, respectively, and a detailed description thereof will be omitted.

In step S604, the camera microcomputer 206 determines whether the power is turned off. In a case where it is determined that the power is not turned off, that is, in a case where it is determined that the power is turned on, the flow proceeds to step S605, and in a case where it is determined that the power is turned off, this flow ends.

In step S605, the camera microcomputer 206 acquires the moving amounts of the tilt lens 112, shift lens 113 and revolving driving unit 114. The camera microcomputer 206 may detect the moving amounts of the tilt lens 112, the shift lens 113, and the revolving driving unit 114, or may acquire their moving amounts detected by the lens microcomputer 111.

In step S606, the camera microcomputer 206 determines whether any one of the moving amounts acquired in step S605 is equal to or larger than a threshold. In a case where it is determined that any one of the moving amounts is equal to or larger than the threshold, that is, any one of the tilt lens 112, the shift lens 113, and the revolving driving unit 114 has been moved, the flow proceeds to step S607; otherwise, the flow proceeds to step S609.

Steps S607 and S608 correspond to steps S204 and S206 in FIG. 2, respectively, and a detailed description thereof will be omitted.

In step S609, the camera microcomputer 206 deletes information about the movable ranges of the tilt lens 112, the shift lens 113, and the revolving driving unit 114 from the display unit 204.

In this embodiment, in a case where the tilt lens 112, the shift lens 113, and the revolving driving unit 114 move, the display unit 204 displays the information on the movable ranges of the tilt lens 112, the shift lens 113, and the revolving driving unit 114. Thereby, the visibility of the display unit 204 can be improved.

Third Embodiment

Figure 7:
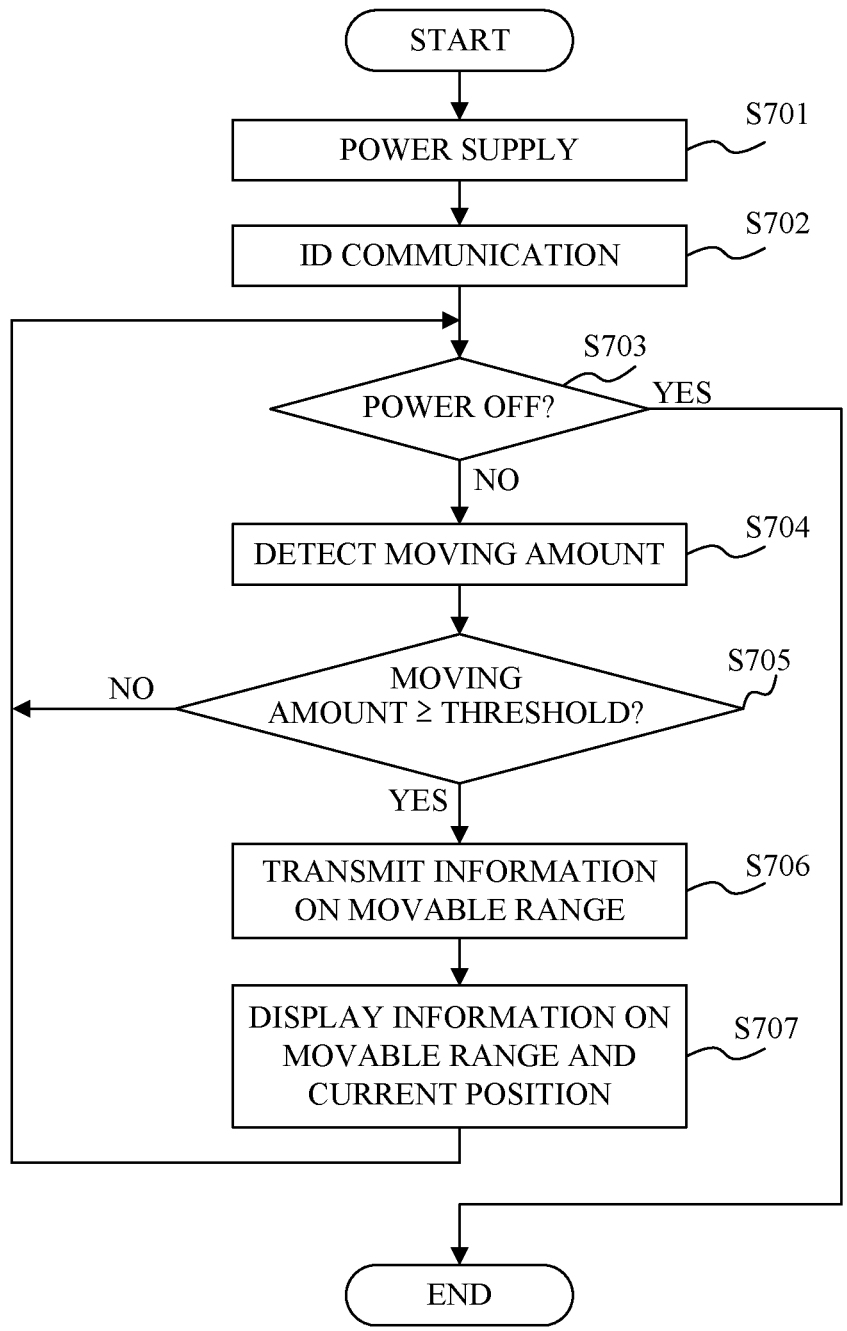
FIG. 7 is a flowchart illustrating an example of a method of displaying information about tilt-shift driving and revolving driving on a display unit according to a third embodiment.

FIG. 7 is a flowchart illustrating an example of a method for displaying information on tilt-shift driving and revolving driving on the display unit 204 according to this embodiment. This flow starts in a case where the camera body 200 is powered on.

Steps S701 and S702 correspond to steps S201 and S202 in FIG. 2, respectively, and a detailed description thereof will be omitted.

In step S703, the camera microcomputer 206 determines whether the power is turned off. In a case where it is determined that the power is not turned off, that is, in a case where it is determined that the power is turned on, the flow proceeds to step S704, and in a case where it is determined that the power is turned off, this flow ends.

In step S704, the lens microcomputer 111 detects moving amounts of the tilt lens 112, the shift lens 113, and the revolving driving unit 114.

In step S705, the camera microcomputer 206 determines whether any one of the moving amounts detected in step S704 is equal to or larger than a threshold. In a case where it is determined that any one of the moving amounts is equal to or larger than the threshold, that is, any one of the tilt lens 112, the shift lens 113, and the revolving driving unit 114 has moved, the flow proceeds to step S706; otherwise, the flow returns to step S703.

In step S706, the lens microcomputer 111 transmits to the camera microcomputer 206 information about the movable range of the member whose moving amount detected in step S702 is equal to or larger than the threshold and the current position.

In step S707, the camera microcomputer 206 displays the information about the movable range and current position of one of the tilt lens 112, shift lens 113, and revolving driving unit 114 using the information received in step S707.

In this embodiment, in a case where the tilt lens 112, the shift lens 113, and the revolving driving unit 114 move, the display unit 204 displays the information about the movable range of one of the tilt lens 112, the shift lens 113, and the revolving driving unit 114. Thereby, the visibility of the display unit 204 can be improved. In addition, even if the camera microcomputer 206 cannot detect the movement of the tilt lens 112 or the shift lens 113, the user can confirm the tilt-shift amount on the display unit 204.

Each of the above embodiments can provide a lens apparatus that enables the user to confirm the tilt-shift amount on the display screen of the image pickup apparatus.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-070734, filed on Apr. 22, 2022, which is hereby incorporated by reference herein in its entirety.

What is claimed is:

1. A lens apparatus attachable to and detachable from an image pickup apparatus, the lens apparatus comprising:
   an imaging optical system that includes an optical member configured to move so as to change at least one of a tilt effect of tilting a focal plane relative to an imaging plane of an image sensor included in the image pickup apparatus or a shift effect of moving an imaging range;
   a first detector configured to detect a position of the at least one optical member; and
   a microcomputer configured to transmit first information and second information to the image pickup apparatus,
   wherein the first information is for displaying a movable range of the optical member on the image pickup apparatus, and
   wherein the second information is for displaying the position of the optical member within the movable range on the image pickup apparatus.

2. The lens apparatus according to claim 1, further comprising:
   a memory configured to store the detected position of the optical member,
   wherein the microcomputer transmits the detected position stored in the memory to the image pickup apparatus.

3. The lens apparatus according to claim 1, wherein the microcomputer transmits the first information and the second information to the image pickup apparatus in a case where the optical member has moved.

4. The lens apparatus according to claim 1, further comprising:

a revolving member configured to revolve around an optical axis of the imaging optical system to change a moving direction of the optical member, wherein the microcomputer transmits information indicating a movable range of the revolving member to the image pickup apparatus.

5. The lens apparatus according to claim 4, further comprising:

a memory configured to store a position of the revolving member, wherein the microcomputer transmits the position stored in the memory to the image pickup apparatus.

6. The lens apparatus according to claim 4, further comprising:

a second detector configured to detect a position of the revolving member, wherein the microcomputer transmits the detected position of the revolving member to the image pickup apparatus.

7. The lens apparatus according to claim 4, wherein the microcomputer transmits the information indicating the movable range of the revolving member to the image pickup apparatus in a case where the revolving member has moved.

8. The lens apparatus according to claim 1, wherein the optical member includes a first optical member that tilts the focal plane relative to the imaging plane of the image sensor included in the image pickup apparatus.

9. The lens apparatus according to claim 8, wherein the optical member includes another optical member configured to move the imaging range.

10. An image pickup apparatus attachable to and detachable from the lens apparatus according to claim 1, the image pickup apparatus comprising:

a display configured to display information about movement of the at least one optical member based on the first and second information transmitted from the lens apparatus.

11. The image pickup apparatus according to claim 10, wherein in a case where the optical member has moved, the second microcomputer causes the display to display the first information and the second information.

12. The image pickup apparatus according to claim 10, wherein the first information is displayed as a bar.

13. The image pickup apparatus according to claim 10, wherein the detected position of the optical member is numerically displayed.

14. The image pickup apparatus according to claim 10, wherein:

the lens apparatus includes a revolving member configured to revolve around an optical axis of the imaging optical system, and the display displays information about movement of the revolving member.

15. The image pickup apparatus according to claim 14, wherein in a case where the revolving member has moved, the display displays the information about the movement of the revolving member.

16. The image pickup apparatus according to claim 14, wherein:

the information about the movement of the revolving member includes third information indicating a movable range of the revolving member and fourth information indicating a detected position of the revolving member, and each of the first information and the third information is displayed as a bar.

17. The image pickup apparatus according to claim 14, wherein:

the information about the movement of the revolving member includes a detected position of the revolving member, and each of the detected position of the optical member and the detected position of the revolving member is numerically displayed.

18. The image pickup apparatus according to claim 14, wherein:

the lens apparatus includes a focus lens configured to perform focusing, and the display unit displays information about movement of the focus lens.

19. The image pickup apparatus according to claim 18, wherein the display unit displays the first information and the second information about movement of one of a pair of the optical member and the revolving member or the focus lens, that has been adjusted.

20. The image pickup apparatus according to claim 18, wherein the display unit displays information about movement of one of the optical member, the revolving member, or the focus lens, that has been adjusted.

21. The lens apparatus according to claim 1, wherein the movable range corresponds to a lower limit to an upper limit of an amount of movement of the optical member upon changing at least one of the tilt effect or the shift effect.

* * * * *